(No Model.)

C. THOMPSON.
CAR WHEEL FOR ELECTRIC CARS, &c.

No. 539,242. Patented May 14, 1895.

WITTNESSES:
Henry T. Hirsch
Wm H Capel

INVENTOR:
Charles Thompson.
by Townsend & Decker
ATTORNEYS.

UNITED STATES PATENT OFFICE.

CHARLES THOMPSON, OF OSWEGO FALLS, ASSIGNOR OF ONE-HALF TO GEORGE J. EMENY, OF FULTON, NEW YORK.

CAR-WHEEL FOR ELECTRIC CARS, &c.

SPECIFICATION forming part of Letters Patent No. 539,242, dated May 14, 1895.

Application filed November 22, 1894. Serial No. 529,662. (No model.)

*To all whom it may concern:*

Be it known that I, CHARLES THOMPSON, a resident of Oswego Falls, in the county of Oswego and State of New York, have invented a new and Improved Car-Wheel for Electric Cars and All Kinds of Street-Cars and Tramways, of which the following is a full, clear, and exact description, that will enable those skilled in the art to make and use the same, reference being had to the accompanying drawings, that form a part of this specification.

My invention relates to car wheels and particularly to that class of compound or two-part car wheels which consist of two parts one of which is movable with relation to the other to provide for the tread of the wheel traveling at a different rate of speed than if it were rigidly attached to the axle. Wheels of this sort have been devised for use on cars which are trailed or drawn by locomotives or other power and are of great advantage in reducing resistance or friction in rounding curves. Obviously such wheels cannot be used as driving wheels and therefore are not practical for use upon locomotives or electric arcs to whose axles the motive power is connected. They are, however much needed for this purpose and I have adapted them to it by adding thereto suitable means for coupling and uncoupling the two parts of the wheel. Such coupling device is so constructed that in rounding a curve the wheel on the inner side of the curve may have its parts uncoupled, allowing the inner part of that wheel to roll within the outer part while the wheel on the outer side of the curve does the propelling, or vice versa as circumstances may require.

The main object of my invention is to provide the necessary coupling device for the purpose above specified and another object is to improve upon the manner of mounting the parts of such compound wheels so as to make them more rigid and better adapted for the ordinary use upon drawn or trailed cars, whether used upon steam railways, street railways or any kind of tramway.

My invention consists in the construction and combination of parts hereinafter fully described and set forth in the claims.

Figure 1:
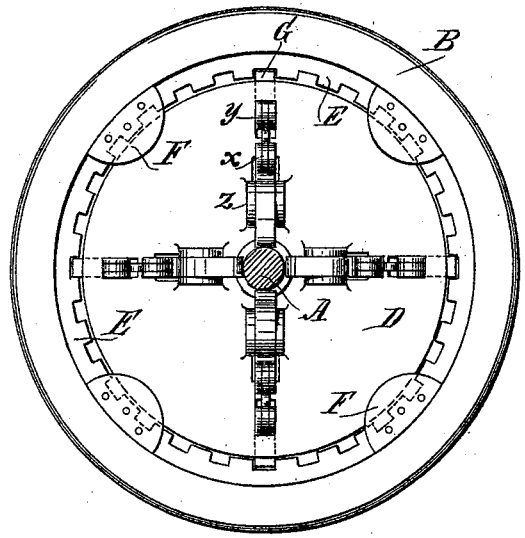
Figure 2:
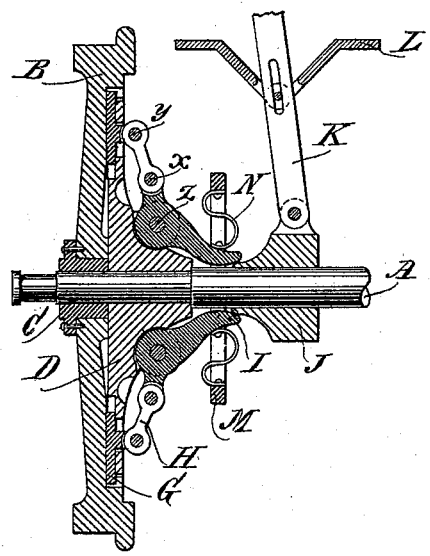
Figure 3:
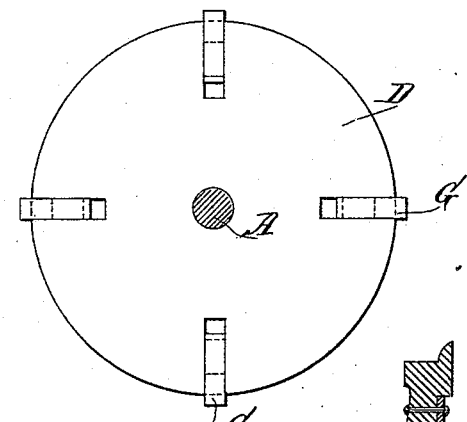
Figure 4:
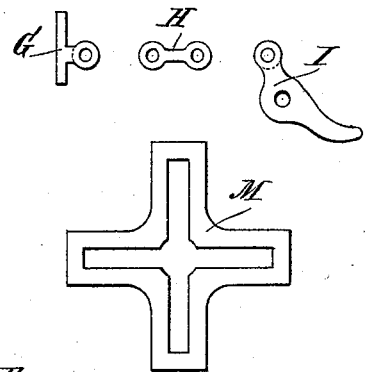
Figure 5:
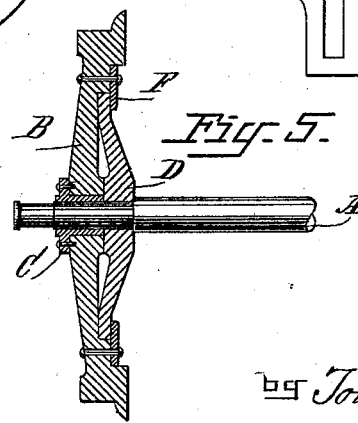

In the drawings which accompany the specification and form a part thereof, Figure 1 represents a rear elevation of my improved wheel provided with the coupling device. Fig. 2 represents a vertical transverse medial section of said wheel. Fig. 3 represents in elevation the inner face of the rigid portion of my improved wheel. Fig. 4 represents the details of the clutch or coupling mechanism. Fig. 5 represents in vertical transverse medial section my compound wheel when made without the coupling mechanism.

In the drawings, A represents the axle; B, the tread-carrying portion of the compound wheel which is journaled by a suitable bearing C upon said axle, and D represents the associate part of said wheel which is rigidly mounted upon the axle at the side of the part B. The part B, is recessed at its inner side as indicated and is provided with suitable projections E, shown by preference located about the circumference of said recess, which projections have between them notches as clearly indicated in Fig. 1. It is in this recess that the part D of the wheel is located. These two parts of the wheel may be held in the position shown by any suitable means as a series of plates secured to the part B, and overlying the edge of the part D. I have shown and prefer to use for this purpose plates as F, which are bolted to the part B. The plates are preferable for the reason that they allow any dirt which may enter the spaces between the projections E, to fall out or be readily removed.

Upon the rigid portion of the wheel is mounted my clutch or coupling mechanism by which the two parts of the wheel may be rigidly held together when desired. This clutch mechanism consists of detents for engagement with the projections E, on the part B, which detents I prefer to construct as shown of sliding pieces G, mounted in suitable ways in the part D, and provided with lugs for the attachment thereto of links H, which in turn are attached to levers I, pivoted upon the part D. These levers project to the rear of the wheel and are beveled or curved at their free ends to fit them for engagement with a sliding cam as J, mounted upon the axle. This cam is shown as indicating any suitable mechanism for operating the clutch and may be shifted by means of a lever as K, which can be operated from the car, a bearing for the lever being formed in a suitable bracket as L, attached to the car or to the truck. The lever is slotted for the reception of the pivot by which it is connected to said bracket, the slot allowing for the proper operation of the lever and any change in distance between the bracket and the axle. A guide for the levers I, is formed by means of a plate M, located upon the axle and provided with radial slots for the reception of the ends of the levers I. Between the ends of the levers and the outer ends of said slots are located springs N.

In the normal position, the sliding detents G, are in engagement with the projections E, as indicated in the drawings, the free ends of the levers I, being pressed toward the axle by means of the springs N. In this position the joint $x$, between the link H, and the lever I, is back of the line joining the pivots $y$ and $z$. By this arrangement the detents are in effect locked in the position of engagement. To release the clutch, that is to withdraw the detents from engagement with the projections, it is simply necessary to force the cam J, between the ends of the levers I, which act throws the joint $x$, across the line between the pivots $y$ and $z$, and as said joint approaches the axle the detents also approach the axle and free the tread carrying portion of the wheel. When it is desired to again couple the parts of the wheel together, the cam J, is forced in the opposite direction when the springs N, return the clutches to the position shown.

When my compound wheel is used as a driving wheel, that is, when it is upon the axle driven by an electric motor or other suitable power, the parts of the wheel are normally united by means of the clutch, and upon the car approaching a curve or a section of the track where the grade is such that a shearing operation takes place between the rim of a wheel and the rail, the lever controlling the clutch mechanism of that wheel is operated to release the tread-bearing portion of the wheel, thereby leaving said portion to simply roll upon the rail while the driving or propelling is done by means of the wheel at the other end of the axle. When such curve or grade is passed the lever K, is thrown in the opposite direction and the springs N, act to force the detents into engagement with the projections E.

When my compound wheel is used upon a trailing car or car drawn by any motive power, the clutch is dispensed with, as indicated in Fig. 5.

I have shown and described my clutch or coupling mechanism as thrown into engagement by means of springs and thrown out of engagement by the action of the lever. Obviously this construction may be reversed and the formation of the parts changed without departing from the invention which is herein illustrated simply in the preferred form. I have also shown four detents though I may use more or less as circumstances may require. I may also apply the springs N, in a different manner and omit the guide M, without changing the effectiveness or mode of operation of the clutch mechanism.

What I claim as my invention is—

1. In a compound or two-part car wheel, the combination with the portion thereof carrying the tread and flange journaled upon the axle and recessed on its inner side, of the associate portion D rigidly fixed to the axle and located within said recess, a series of plates placed at intervals and connected to the journaled portion and lapping onto the fixed portion for retaining said portions in juxtaposition, substantially as shown and described.

2. In a compound or two-part car wheel, the combination with the tread carrying portion journaled upon the axle and provided with a recess on its inner side, of the associate portion rigidly fixed to the axle, means connected to the journaled portion for holding it and the rigid portions in juxtaposition, and a clutch mechanism mounted upon the rigid portion for coupling the two parts of the wheel together for the purpose set forth.

3. In a compound car wheel, the combination with the portion journaled upon the axle, of the associate portion rigidly mounted upon the axle, plates as F, upon the former for retaining the two portions in juxtaposition, a clutch mechanism mounted on the rigid portion and provided with independent reciprocating detents, projections upon the movable portion of the wheel near the periphery thereof with which said detents engage, and means operable by a lever on the car for projecting and withdrawing said detents.

4. The combination with the axle, of the tread-carrying portion of the wheel journaled thereon, and provided with a series of projections, the portion of the wheel rigidly mounted upon the axle, the sliding detents mounted in said rigid portion, levers connected thereto, and means operating upon said levers for reciprocating the detents as desired.

5. The combination with the axle and the members of the compound car wheel mounted thereon, of the clutch mechanism mounted upon one part of the wheel and consisting of the sliding detents for engaging with projections E, upon the other part of the wheel, the lever I, the links connecting said detents and levers, the guide for the levers, springs acting upon said levers to move the detents into engagement with said projections, and means mounted upon the axle for engaging the free ends of the levers to effect the withdrawal of the detents.

6. The combination with the axle, of the tread carrying portion of the wheel journaled thereon and recessed at one side, of the rigid portion of the wheel located in said recess, means for retaining said portions in such relation, projections upon the journaled portion about the periphery of the recess, and clutch mechanism upon the rigid portion provided with radially sliding detents for engagement with said projections.

CHARLES THOMPSON.

Witnesses:
J. R. SULLIVAN,
F. H. SUMMERVILLE.